United States Patent

Matsuoka et al.

[11] 3,997,631
[45] Dec. 14, 1976

[54] GAS-LIQUID MIXING APPARATUS USING AN EJECTOR

[75] Inventors: Hiromasa Matsuoka; Norikazu Tabata, both of Amagasaki, Japan

[73] Assignee: Mitsubishi Denki Kabushiki Kaisha, Tokyo, Japan

[22] Filed: Aug. 8, 1975

[21] Appl. No.: 603,146

[30] Foreign Application Priority Data

Aug. 29, 1974 Japan .................. 49-99264

[52] U.S. Cl. .................. 261/37; 210/192; 261/64 B; 261/76; 261/DIG. 75
[51] Int. Cl.² .................. B01F 3/04
[58] Field of Search .................. 261/76, DIG. 75, 37, 261/63, 64 B, 64 A; 210/63, 192

[56] References Cited
UNITED STATES PATENTS

| | | | |
|---|---|---|---|
| 1,810,131 | 6/1931 | Daily .................. | 261/76 |
| 3,257,180 | 6/1966 | King .................. | 261/76 X |
| 3,732,163 | 5/1973 | Lapidot .................. | 210/63 X |
| 3,780,198 | 12/1973 | Pahl et al. .................. | 261/DIG. 75 X |
| 3,856,671 | 12/1974 | Lee et al. .................. | 210/63 |

Primary Examiner—Frank W. Lutter
Assistant Examiner—William Cuchlinski, Jr.
Attorney, Agent, or Firm—Oblon, Fisher, Spivak, McClelland & Maier

[57] ABSTRACT

An ejector type gas-liquid mixing apparatus having a valve for feeding a gas, which does not adversely affect the main gas-liquid mixing operation, into the gas feed system thereof, when the pressure of the gas feed system decreases below a predetermined value, wherein the valve is disposed between an aspirating inlet of the ejector and the gas feeder. Thus, in an apparatus for mixing a liquid and ozone using an ejector, which comprises a first pipe system for connecting the ejector and an ozone generator, a second pipe system for connecting a reaction vessel for separating the unreacted ozone from the gas-liquid mixture fluid fed from the ejector, an exhaust ozone removing device for removing the unreacted ozone, and such check valve connecting the first and second pipe systems, any ozone leaked from the check valve is removed by the exhaust ozone removing device and counterflowing liquid from the aspirating inlet of the ejector to the gas feed system is prevented.

2 Claims, 3 Drawing Figures

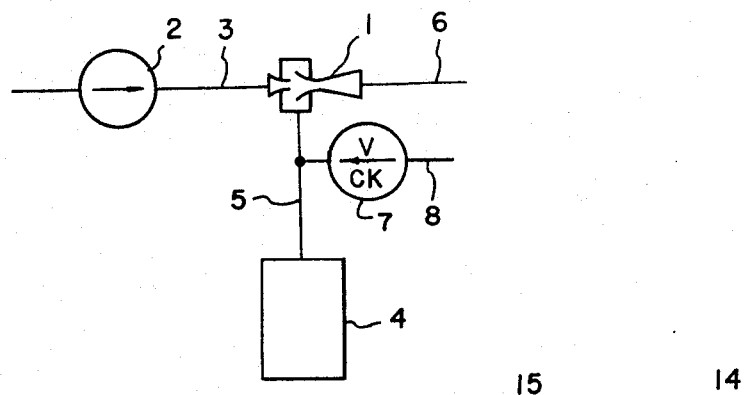
FIG. 1
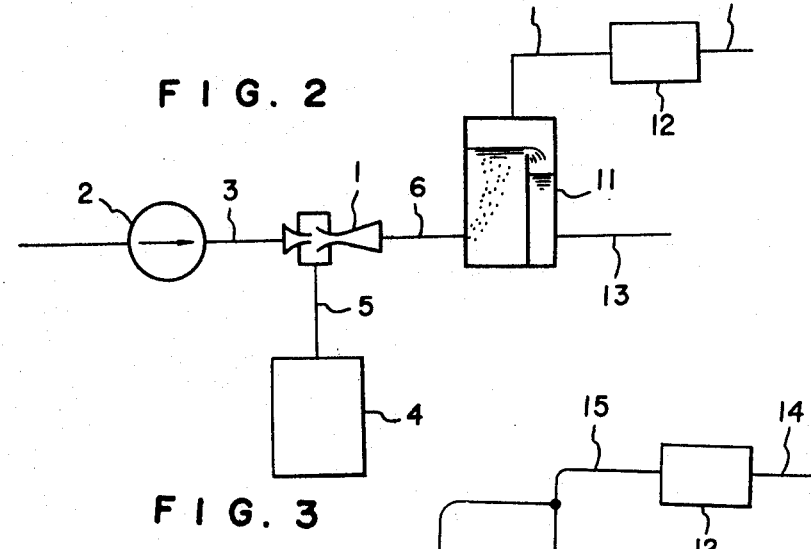
FIG. 2
FIG. 3
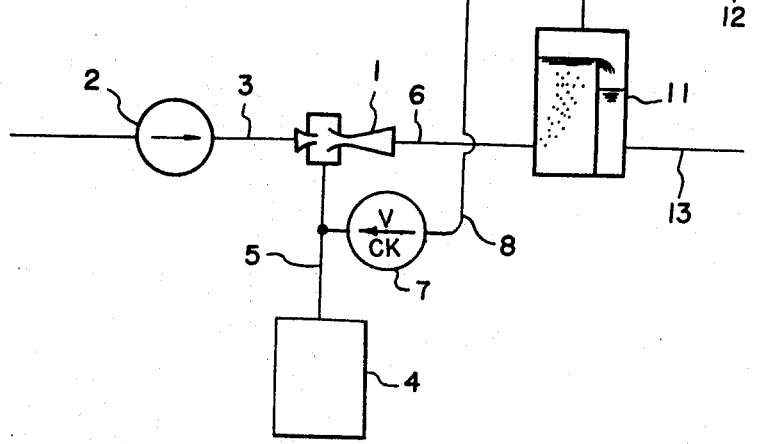

GAS-LIQUID MIXING APPARATUS USING AN EJECTOR

BACKGROUND OF THE INVENTION

1. Field of the Invention

The present invention relates generally to an improved apparatus for mixing gas and liquid and more particularly to an improved apparatus as characterized which includes an ejector.

2. Description of the Prior Art

Among the known gas-liquid mixing methods are those typified by the use of a perforated plate and an ejector. In the perforated plate method, a gas is passed through a perforated member, such as a porous plate or a cylinder, which is dipped in a liquid, to cause mixing of the gas therein as fine bubbles. On the other hand, in the ejector method, a compressed liquid is fed to a nozzle of an ejector to cause mixing of a gas therewith by aspirating the gas under negative pressure around the jet stream of the liquid flowing from the nozzle at high velocity.

The ejector method may be considered to have advantages over the perforated plate method from the viewpoint that fine bubbles are formed therein and because the perforated plate method requires a compressed gas. whereas the ejector method can be operated under atmospheric pressure without need of a compressed gas. Accordingly, the ejector method is preferably employed. However, the ejector method also has certain disadvantages, such as occurs when the feed rate of the gas being fed from the gas feeder is lower than the aspirating volume rate of the ejector, in which case the pressure of the gas feed system, including the gas feeder, decreases to cause trouble. That is, there is a possibility that a counterflow of the liquid from the gas aspirating inlet of the ejector to the gas feed system will develop after the termination of the operation of the ejector. Generally, a structure is provided for preventing such counterflow, such as an electromagnetic valve or other check valve, even though the gas feed system is in negative pressure. However, it often happens that this valve is not properly actuated, in which case, such counterflow is not always prevented.

SUMMARY OF THE INVENTION

It is therefore an object of the present invention to provide an improved apparatus which will overcome the above-mentioned disadvantages of the typical ejector method and prevent the counterflow of liquid by preventing a negative pressure from developing in the gas feed system.

Thus, in the present invention, a valve, such as a check valve, is disposed between the aspirating inlet of the ejector and the gas feeder so as to provide an additional aspirating gas not having an adverse affect on the purpose of the gas-liquid mixing being performed when the pressure of the gas feed system decreases below a predetermined value. In a preferred embodiment, the gas-liquid mixing apparatus according to the present invention comprises an ejector for gas-liquid mixing, such as for mixing ozone and a liquid, a reaction vessel connected to the outlet side of the ejector, an exhaust ozone removing device for removing the ozone discharged from the reaction vessel, and a check valve disposed between a first pipe system connecting an ozone generator for generating ozone to the ejector and a second pipe system connecting the reaction vessel to the exhaust ozone removing device, whereby any ozone leaked from the check valve is fed to the exhaust ozone removing device for removing the unreacted ozone and the remaining gas is discharged to the atmosphere. With such a gas-liquid mixing apparatus, counterflow of the liquid from the gas aspirating inlet of the ejector to the gas feed system can be satisfactorily prevented and ozone leaked from the check valve can be removed by the exhaust ozone removing device to prevent leakage of ozone to the atmosphere.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference numerals designate like or corresponding parts and in which:

FIG. 1 is a system diagram of one embodiment of a gas-liquid mixing apparatus according to the present invention;

FIG. 2 is a system diagram illustrating the background of the invention; and

FIG. 3 is a system diagram of another embodiment of a gas-liquid mixing apparatus according to the present invention.

DESCRIPTION OF THE PREFERRED EMBODIMENTS

As pointed out hereinbefore, the principal disadvantage of the ejector method, being the occurrence of liquid counterflow, can be prevented by preventing the development of negative pressure in the gas feed system.

Referring then to the drawings, and more particularly to FIG. 1, a gas-liquid mixing apparatus formed according to the teachings of this invention is shown to include an ejector 1, a pump 2, for feeding a compressed liquid to the ejector 1, being connected thereto by a pipe 3, a gas feeder 4 connected to the ejector 1 by a pipe 5 for feeding the gas thereto, an outlet pipe 6 for a gas-liquid mixture to be discharged from the ejector, and a check valve 7 for preventing negative pressure in the gas feed system by permitting flow of a fluid only in the direction indicated by the arrow through a pipe 8 for feeding a gas into pipe 5 which has no adverse affect on the purpose of the primary gas-liquid mixing being performed. Thus, the counterflow of liquid to the gas feed system is prevented by feeding the gas from the pipe 8 under opening of the valve 7 when the pressure of the gas feed system falls below a predetermined value.

In the structure of FIG. 1, when air does not adversely affect the purpose to which the gas-liquid mixing is applied, the pipe 8 can be opened to the atmosphere. Under a normal operational condition, in some cases, the pressure of the gas feed system is that of atmospheric pressure or sometimes preferably slightly higher. Accordingly, when the check valve 7 is not completely closed, such as because of an improper or accidental operation thereof, the gas feed from feeder 4 for the gas-liquid mixing leaks to the atmosphere to thereby cause a problem. It is therefore necessary to consider the problem of such leaked gas. When ozone, for example, is used as the feed gas, ozone and the liquid are mixed in the ejector 1 and then the gas-liquid mixture fluid is fed through the outlet 6 to a reaction vessel to cause reaction. However, a small amount of the unreacted ozone remains in the exhaust gas. This exhaust gas can be discharged through an exhaust ozone removing device, for removing the unreacted ozone, to the atmosphere.

The structure shown in FIG. 2 will now be described in order to provide further background. In FIG. 2, there is shown an ejector 1, a pump 2, a gas feeder 4, which in this case is an ozone generator, a reaction vessel 11 having the gas-liquid separating function for separating the unreacted gas, an exhaust ozone removing device 12, an outlet pipe 13 from the reaction vessel 11 for the liquid after the reaction with ozone, an outlet pipe 14 from the ozone removing device for unreacted gas after the ozone has been removed and a pipe 15 connecting the reaction vessel 11 and the exhaust ozone removing device 12. In accordance with the apparatus shown in FIG. 2, as stated above in general discussion, the pressure of the gas feed system decreases when the feed rate of the gas fed from the gas feeder is lower than the aspirating volume rate of the ejector 1, whereby the liquid may be disadvantageously counterflowed from the gas inlet of the ejector to the gas feed system after termination of operation of the ejector.

Another embodiment of the present invention providing improvement on the above-mentioned problem is shown in FIG. 3. Here an ejector 1 for gas-liquid mixing is fed compressed liquid by a pump 2, through a pipe 3, and an ozone generator 4 feeds ozone through a pipe 5 to the ejector 1. The outlet pipe 6 of the ejector 1 passes the gas-liquid fluid to a reaction vessel 11, which has a function for reacting ozone with the liquid and/or a material contained in the liquid and also a gas-liquid separating function for separating the unreacted ozone. An outlet pipe 13 is provided for the liquid after the reaction with ozone. An exhaust ozone removing device 12 for removing the unreacted ozone discharged from the reaction vessel 11 is connected by a pipe 15 to the reaction vessel 11, the exhaust ozone removing device 12 having an outlet pipe 14 for discharging the unreacted gas after removing the unreacted ozone.

In accordance with the apparatus of the present invention, therefore, ozone leaked from the check valve 7, when such is not properly closed, is fed to the exhaust ozone removing device 12 for removing the unreacted ozone and then the gas is safely discharged to the atmosphere. Accordingly, it is effective not only for ozone leaked from the check valve 7 but also for the further utilization of ozone which has been already aspirated and mixed, when the ozone feed system becomes negative pressure, to open the check valve 7, being supplied through pipes 8 and 15 from the reaction vessel 11.

The part connecting through the check valve 7 is not limited to the pipe 5 and the pipe 15. Instead of the pipe 5, for example, the check valve can be connected to any part which becomes negative pressure when the feed of the gas from the ozone generator 4 is decreased. Instead of the pipe 15, the check valve can be directly connected to the inlet of the exhaust ozone removing device and also to the upper part, or gas phase part, of the reaction vessel 11. The check valve 7 can also be replaced by a valve having a similar function, such as an interlocking mechanism of a pressure differential switch or an electromagnetic valve.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. In a gas-liquid mixing apparatus comprising an ejector having an inlet for receiving a liquid for gas-liquid mixing and a gas feeder fluidically connected to said ejector by means of a pipe for feeding a gas into the ejector, the improvement comprising:
   a valve fluidically connected to said pipe and disposed between an aspirating inlet of the ejector and the gas feeder,
   said valve being connected to a gas source for supplying a second gas which does not adversely affect the purpose of the gas-liquid mixing operation being performed,
   whereby the second gas from said gas source is fed to the aspirating inlet of said ejector when the pressure of the gas feeder decreases below a predetermined value.

2. A gas-liquid mixing apparatus which comprises:
   a pump for compressing a liquid which is to be mixed with a gas;
   an ozone generator for generating ozone which is to be mixed with the liquid;
   an ejector fluidically connected to said pump and said ozone generator for gas-liquid mixing said compressed liquid and said ozone;
   a first pipe system connecting said ozone generator and said ejector;
   a reaction vessel fluidically connected to said ejector which receives the gas-liquid mixture fluid formed by said ejector to react ozone with the liquid and/or a material contained in the liquid and which separates the unreacted ozone;
   an exhaust ozone removing device for removing the unreacted ozone from said reaction vessel;
   a second pipe system connecting the reaction vessel to the exhaust ozone removing device; and
   a third pipe system connecting said first and second pipe systems through a check valve.

* * * * *